US012732565B2

(12) United States Patent
Rajput et al.

(10) Patent No.: US 12,732,565 B2
(45) Date of Patent: Sep. 8, 2026

(54) METHODS, SYSTEMS, AND COMPUTER READABLE MEDIA FOR NETWORK ANALYTICS DATA DIRECTOR (NADD)-INFORMED AUTOMATIC CONFIGURATION OF MAXIMUM RESPONSE TIMES

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN); Ashish Kumar, Gurgaon (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 22 days.

(21) Appl. No.: 18/934,178

(22) Filed: Oct. 31, 2024

(65) Prior Publication Data

US 2026/0122142 A1 Apr. 30, 2026

(51) Int. Cl.
*H04L 67/51* (2022.01)
*H04L 67/562* (2022.01)

(52) U.S. Cl.
CPC ............ *H04L 67/51* (2022.05); *H04L 67/562* (2022.05)

(58) Field of Classification Search
CPC ...................................................... H04L 67/51
See application file for complete search history.

(56) References Cited

U.S. PATENT DOCUMENTS 11,140,047 B2 10/2021 Shan
11,811,863 B2 11/2023 Shariat
(Continued)

FOREIGN PATENT DOCUMENTS

CN 114980200 A * 8/2022 ............. H04L 1/188
IN 202241006739 A 11/2023

OTHER PUBLICATIONS

"5G; 5G System; Session Management Services; Stage 3 (3GPP TS 29.502, V16.6.0 Release 16)" ETSI TS 129 502, V16.6.0, pp. 1-283 (Jan. 2021).

(Continued)

*Primary Examiner* — Esther B. Henderson
(74) *Attorney, Agent, or Firm* — Jenkins, Taylor & Hunt, P.A.

(57) ABSTRACT

A method for network analytics data director (NADD)-informed configuration of a 3gpp-Sbi-Max-Rsp-Time header value includes receiving, at the NADD and from network functions (NFs), NF configuration details and copies of service-based interface (SBI) messages transmitted to and received by the NFs, determining service operation processing times of the NFs, and communicating, to an NF service consumer, NF analytics data including the service operation processing times and the NF configuration details. The method further includes automatically determining, by the NF service consumer and using the NF analytics data, a 3gpp-Sbi-Max-Rsp-Time header value for an SBI request message, adding, by the NF service consumer, the 3gpp-Sbi-Max-Rsp-Time header value to the SBI request message, and transmitting, by the NF service consumer, the SBI request message to a destination.

20 Claims, 10 Drawing Sheets

(56) References Cited

U.S. PATENT DOCUMENTS

| | | | | |
|---|---|---|---|---|
| 11,917,016 | B2 | 2/2024 | Krishan | |
| 12,500,826 | B2 | 12/2025 | Sofuoglu | |
| 2018/0262924 | A1 | 9/2018 | Dao et al. | |
| 2019/0222489 | A1 | 7/2019 | Shan | |
| 2020/0288296 | A1 | 9/2020 | Fiorese et al. | |
| 2020/0313999 | A1 | 10/2020 | Lee et al. | |
| 2021/0021494 | A1 | 1/2021 | Yao et al. | |
| 2023/0065199 | A1 | 3/2023 | Khare et al. | |
| 2023/0171182 | A1 | 6/2023 | Goel et al. | |
| 2023/0269608 | A1 | 8/2023 | Pestana | |
| 2023/0300200 | A1* | 9/2023 | Krishan | H04W 76/18 370/328 |
| 2023/0359528 | A1 | 11/2023 | Mouroulis et al. | |
| 2024/0031430 | A1 | 1/2024 | Shariat | |
| 2024/0172035 | A1 | 5/2024 | Chunduri et al. | |
| 2024/0298225 | A1 | 9/2024 | Hyde et al. | |
| 2024/0348523 | A1 | 10/2024 | Sofuoglu | |
| 2025/0184238 | A1 | 6/2025 | Singh et al. | |
| 2025/0203433 | A1 | 6/2025 | Kheirkhah et al. | |
| 2025/0267070 | A1 | 8/2025 | An et al. | |
| 2026/0067193 | A1* | 3/2026 | Rajput | H04L 43/0852 |
| 2026/0067752 | A1 | 3/2026 | Chellasamy et al. | |

OTHER PUBLICATIONS

Esfandiari, “Powering the Autonomous 5G Core”, Pipeline Publishing, L.L.C., vol. 19, Issue 11, pp. 1-4 (2023).

Nadar, et al., “Enhancing Network Data Analytics Functions: Integrating AlaaS with ML Model Provisioning”, 2024 22nd Mediterranean Communication and Computer Networking Conference (MedComNet). IEEE, pp. 1-4 (2024).

Garcia-Martin, et al., “Network automation and data analytics in 3gpp 5g systems.” IEEE Network 38.4 (2023): 182-189.

Chouman, et al., “A Modular, End-to-End Next-Generation Network Testbed: Towards a Fully Automated Network Management Platform”, arXiv.org, arXic:2403.15376v1, pp. 1-47 (Mar. 22, 2024).

Nokia, “Clarifications for Indirect Communications”, 3GPP TSG-CT WG4 Meeting #99e, pp. 1-5 (Aug. 18-28, 2020).

Fielding, et al., “Hypertext Transfer Protocol (HTTP/1.1): Message Syntax and Routing”, Internet Engineering Task Force (IETF), RFC 7230 (Jun. 2014).

“3rd Generation Partnership Project; Technical Specification Group Core Network and Terminals; 5G System; Technical Realization of Service Based Architecture; Stage 3 (Release 18)”, 3GPP TS 29.500, V18.7.0, p. 1—(Sep. 2024).

“3rd Generation Partnership Project; Technical Specification Group Core Network and Terminals; 5G System; Network Function Repository Services; Stage 3 (Release 19)”, 3GPP TS 29.510, V19.0.0, pp. 1-435 (Sep. 2024).

Commonly-Assigned, co-pending U.S. Appl. No. 18/826,073 for “Methods, Systems, and Computer Readable Media for Network Analytics Data Director (NADD)-Assisted Producer Network Function (NF) Selection,” (Unpublished, filed Sep. 5, 2024).

“3rd Generation Partnership Project; Technical Specification Group Core Network and Terminals; 5G System; Network Function Repository Services; Stage 3 (Release 18)”, 3GPP TS 29.510, V18.7.0, pp. 1-426 (Jun. 2024).

“3rd Generation Partnership Project; Technical Specification Group Core Network and Terminals; 5G System; Technical Realization of Service Based Architecture; Stage 3 (release 18)”, 3GPP TS 29.500, V18.6.0, pp. 1-151 (Jun. 2024).

3rd Generation Partnership Project; Technical Specification Group Core Network and Terminals; 5G System; Network Function Repository Services; Stage 3 (Release 19) 3GPP TS 29.510 V19.0.0 (Sep. 2024).

3rd Generation Partnership Project; Technical Specification Group Core Network and Terminals; 5G System; Technical Realization of Service Based Architecture; Stage 3 (Release 19) 3GPP TS 29.500 V19.0.0 (Sep. 2024).

3rd Generation Partnership Project; Technical Specification Group Core Network and Terminals; 5G System; Session Management Policy Control Service; Stage 3 (Release 19) 3GPP TS 29.512 V19.0.0 (Sep. 2024).

3rd Generation Partnership Project; Technical Specification Group Core Network and Terminals; 5G System; Binding Support management Service; Stage 3 (Release 19) 3GPP TS 29.521 V19.0.0 (Sep. 2024).

3rd Generation Partnership Project; Technical Specification Group Core Network and Terminals; 5G System; Usage of the Unified Data Repository service for Policy Data, Application Data, and Structured Data for Exposure; Stage 3 (Release 19) 3GPP TS 29.519 V19.0.1 (Sep. 2024).

3rd Generation Partnership Project; Technical Specification Group Core Network and Terminals; 5G System; Spending Limit Control Service; Stage 3 (Release 19) 3GPP TS 29.594 V19.0.0 (Sep. 2024).

“5G; 5G System; Session Management Services; Stage 3 (3GPP TS 29.502 version 16.6.0 Release 16)”, ETSI TS 129 502, V16.6.0, pp. 1-283 (Jan. 2021).

“Clarifications for Indirection Communications”, Nokia, 3GPP TSG-CT WG4 Meeting #99e, E-Meeting, C4-204189, pp. 1-5 (Aug. 18-28, 2020).

“5G; 5G System; Technical Realization of Service Based Architecture; Stage 3 (3GPP TS 29.500 version 15.3.0 Release 15)”, ETSI TS 129 500, V15.3.0, pp. 1-36 (Jul. 2019).

“3rd Generation Partnership Project; Technical Specification Group Core Network and Terminals; 5G System; Technical Realization of Service Based Architecture; Stage 3 (Release 18)”, 3GPP TS 29.500, V18.7.0, pp. 1-151 (Sep. 2024).

Commonly-Assigned, co-pending U.S. Appl. No. 19/009,897 for “Methods, Systems, and Computer Readable Media for Intelligent Admission Control in Service-Based Interface Network Functions,” (Unpublished, filed Jan. 3, 2025).

Commonly-Assigned, co-pending U.S. Appl. No. 18/816,840 for “Methods, Systems, and Computer Readable Media for Dynamically Adjusting Producer Network Function (NF) Service-Based Interface (SBD) Response Message Processing Timeouts at Service Communication Proxy (SCP) or Consumer NF,” (Unpublished, filed Aug. 27, 2024).

“3rd Generation Partnership Project; Technical Specification Group Services and System Aspects; Procedures for the 5G System (5GS); Stage 2 (Release 18)”, 3GPP TS 23.502, V18.6.0, pp. 1-717 (Jun. 2024).

“3rd Generation Partnership Project; Technical Specification Group Services and System Aspects; System architecture for the 5G System (5GS); Stage 2 (Release 19)”, 3GPP TS 23.501, V19.0.0, pp. 1-722 (Jun. 2024).

“3rd Generation Partnership Project; Technical Specification Group Core Network and Terminals; 5G System; Technical Realization of Service Based Architecture; Stage 3 (Release 18)”, 3GPP TS 29.500, V18.6.1, pp. 1-151 (Aug. 2024).

Non-Final Office Action for U.S. Appl. No. 18/826,073 (Feb. 19, 2026).

* cited by examiner

METHODS, SYSTEMS, AND COMPUTER READABLE MEDIA FOR NETWORK ANALYTICS DATA DIRECTOR (NADD)-INFORMED AUTOMATIC CONFIGURATION OF MAXIMUM RESPONSE TIMES

TECHNICAL FIELD

The subject matter described herein relates to routing messages in a communications network. More particularly, the subject matter described herein relates to automatically configuring the value carried by the 3gpp-Sbi-Max-Rsp-Time header using analytics provided by a network analytics node, such as a network analytics data director (NADD).

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF service instance is a service instance of a producer NF that provides one or more services. A given producer NF may include more than one NF service instance. It should also be noted that multiple NF service instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between NF instances. An SCP can also invoke the NF discovery service operation to learn about available NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks is that the value carried by the 3gpp-Sbi-Max-Rsp-Time header may be sub-optimally configured. The value carried by the 3gpp-Sbi-Max-Rsp-Time header (hereinafter, "3gpp-Sbi-Max-Rsp-Time header value"). Is a time value specified by the sender of an SBI request message that defines the amount of time that the sender will wait for a response to the SBI request message before considering the transaction to be timed out. If the 3gpp-Sbi-Max-Rsp-Time header value is set too high, transaction timeouts will be delayed (i.e., transactions that should time out will be kept alive for an unnecessarily long period of time). If the 3gpp-Sbi-Max-Rsp-Time header value is set too low, unnecessary timeouts and retransmissions will occur. Currently, the 3gpp-Sbi-Max-Rsp-Time header value is statically configured by sending NFs and SCPs and is not adaptable to changing network conditions and network topology updates.

Accordingly, in light of these and other difficulties, there exists a need for improved methods, systems, and computer readable media for configuring the 3gpp-Sbi-Max-Rsp-Time header value.

SUMMARY

A method for network analytics data director (NADD)-informed configuration of a 3gpp-Sbi-Max-Rsp-Time header value includes receiving, at the NADD and from network functions (NFs), NF configuration details and copies of service-based interface (SBI) messages transmitted to and received by the NFs. The method further includes determining, by the NADD and from the copies of the SBI messages, service operation processing times of the NFs. The method further includes communicating, by the NADD and to an NF service consumer, NF analytics data including the service operation processing times and the NF configuration details. The method further includes automatically determining, by the NF service consumer and using the NF analytics data, a 3gpp-Sbi-Max-Rsp-Time header value for an SBI request message. The method further includes adding, by the NF service consumer, the 3gpp-Sbi-Max-Rsp-Time header value to the SBI request message. The method further includes transmitting, by the NF service consumer, the SBI request message to a destination.

According to another aspect of the subject matter described herein, receiving the copies of the SBI messages includes receiving SBI message feeds from the NFs.

According to another aspect of the subject matter described herein, determining the service operation processing times includes determining minimum, maximum, and mean or median service operation processing times of the NFs.

According to another aspect of the subject matter described herein, communicating the NF configuration details includes communicating data indicating maximum re-attempts allowed by a service communication proxy (SCP).

According to another aspect of the subject matter described herein, communicating the NF analytics data comprises communicating predicted times for different service operations and routes.

According to another aspect of the subject matter described herein, automatically determining, by the NF service consumer, a 3gpp-Sbi-Max-Rsp-Time header value includes setting the value to account for retries to NF service producers added to a network topology.

According to another aspect of the subject matter described herein, automatically determining, by the NF service consumer, a 3gpp-Sbi-Max-Rsp-Time header value includes setting the value to account for an NF-service-producer-specific processing delay.

According to another aspect of the subject matter described herein, automatically determining, by the NF service consumer, a 3gpp-Sbi-Max-Rsp-Time header value includes setting the value to account for a Third Generation Partnership Project communication model used to send the SBI request message.

According to another aspect of the subject matter described herein, automatically determining, by the NF service consumer, a 3gpp-Sbi-Max-Rsp-Time header value includes setting the value to account for delays associated with a route of the SBI request message.

According to another aspect of the subject matter described herein, the NF service consumer comprises a service communication proxy (SCP).

According to another aspect of the subject matter described herein, a system for network analytics data director (NADD)-informed configuration of a 3gpp-Sbi-Max-Rsp-Time header value is provided. The system includes a network analytics data director including at least one processor and a memory for receiving, from network functions (NFs), NF configuration details and copies of service-based interface (SBI) messages transmitted to and received by the NFs, determining, by the NADD and from the copies of the SBI messages, service operation processing times of the NFs, and communicating NF analytics data including the service operation processing times and the NF configuration details. The system further includes an NF service consumer including at least one processor and a memory for receiving the analytics data from the NADD, automatically determining, using the NF analytics data, a 3gpp-Sbi-Max-Rsp-Time header value for an SBI request message, adding the 3gpp-Sbi-Max-Rsp-Time header value to the SBI request message, and transmitting the SBI request message to a destination.

According to another aspect of the subject matter described herein, the NADD is configured to determine minimum, maximum, and mean or median service operation processing times of the NFs.

According to another aspect of the subject matter described herein, the NADD is configured to communicate, to the NF service consumer, data indicating a maximum number of re-attempts allowed by a service communication proxy (SCP).

According to another aspect of the subject matter described herein, the NADD is configured to communicate, to the NF service consumer, predicted times for different service operations and routes.

According to another aspect of the subject matter described herein, the NF service consumer is configured to automatically determine the 3gpp-Sbi-Max-Rsp-Time header value by setting the value to account for retries to NF service producers added to a network topology.

According to another aspect of the subject matter described herein, the NF service consumer is configured to automatically determine the 3gpp-Sbi-Max-Rsp-Time header value by setting the value to account for an NF-service-producer-specific processing delay.

According to another aspect of the subject matter described herein, the NF service consumer is configured to automatically determine the 3gpp-Sbi-Max-Rsp-Time header value by setting the value to account for a Third Generation Partnership Project communication model used to send the SBI request message.

According to another aspect of the subject matter described herein, the NF service consumer is configured to automatically determine the 3gpp-Sbi-Max-Rsp-Time header value by setting the value to account for delays associated with a route of the SBI request message.

According to another aspect of the subject matter described herein, the NF service consumer comprises a service communication proxy (SCP).

According to another aspect of the subject matter described herein, one or more non-transitory computer readable media having stored thereon computer-executable instructions that when executed by one or more processors of one or more computers cause the one or more computers to perform steps are provided. The steps include receiving, at a network analytics data director (NADD) and from network functions (NFs), NF configuration details and copies of service-based interface (SBI) messages transmitted to and received by the NFs. The steps further include determining, by the NADD and from the copies of the SBI messages, service operation processing times of the NFs. The steps further include communicating, by the NADD and to an NF service consumer, NF analytics data including the service operation processing times and the NF configuration details. The steps further include automatically determining, by the NF service consumer and using the NF analytics data, a 3gpp-Sbi-Max-Rsp-Time header value for an SBI request message. The steps further include adding, by the NF service consumer, the 3gpp-Sbi-Max-Rsp-Time header value to the SBI request message. The steps further include transmitting, by the NF service consumer, the SBI request message to a destination.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
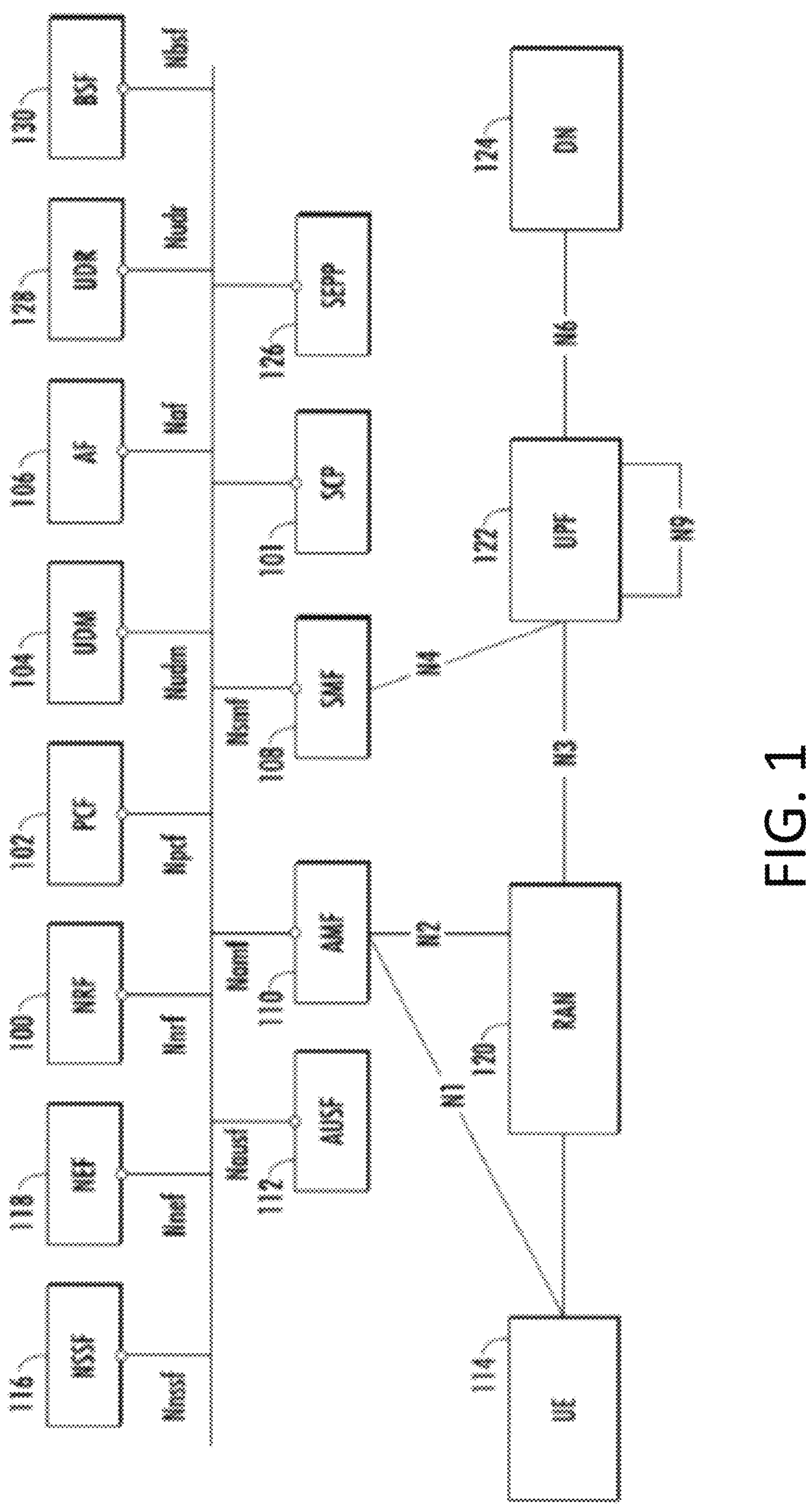
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is that the 3gpp-Sbi-Max-Rsp-Time header value is currently statically and sub-optimally configured. An appropriate value of the 3gpp-Sbi-Max-Rsp-Time header is required to be configured on the NF service consumer. A 3gpp-Sbi-Max-Rsp-Time header value that is too low will cause an SBI request to be discarded at the NF service producer. A 3gpp-Sbi-Max-Rsp-Time header value that is too high will cause the pending transaction context for an SBI request to be maintained for an excessively long duration on the NF service consumer, which results in wasted resources for monitoring (CPU) and storage (RAM). An excessively high 3gpp-Sbi-Max-Rsp-Time header value may also cause inefficiencies in route selection and waste resources on the entities involved. Further, a statically configured value of the 3gpp-Sbi-Max-Rsp-Time header value on the NF service consumer is not adaptable based on network topology changes. For example, an update in the number of NF service producers may cause a change in the number of re-attempts at the SCP involved in the indirect communication and so require the network operator to manually update the value of 3gpp-Sbi-Max-Rsp-Time on the NF service consumer. Manual management of the 3gpp-Sbi-Max-Rsp-Time is error-prone due to the complexities involved in calculation of the 3gpp-Sbi-Max-Rsp-Time header value.

The subject matter described herein includes methods, systems, and computer readable media for automatic configuration of the 3gpp-Sbi-Max-Rsp-Time header value based on network analytics data provided by a network analytics data director (NADD). NADD-generated network analytics data may include details about the SBI traffic, configuration of a maximum number of allowed SBI transactions re-attempts on an SCP, and other details needed for configuration of 3gpp-Sbi-Max-Rsp-Time header value.

An NF service consumer or an SCP acting as an NF service consumer may include, in an SBI request message, a 3gpp-Sbi-Max-Rsp-Time header value along with a timestamp value carried in a 3gpp-Sbi-Sender-Timestamp header (hereinafter, "3gpp-Sbi-Sender-Timestamp header value") to assist downstream NFs in determining when a transaction should time out. The 3gpp-Sbi-Sender-Timestamp header is defined in section 5.2.3.3.2 of 3GPP TS 29.500. This header contains the date and time (with millisecond granularity) at which an HTTP request or response is originated. The encoding of the header follows the Augmented Backus-Naur Form (ABNF) as defined in Internet Engineering Task Force (IETF) Request for Comments (RFC) 7230 and is defined as follows:

```
3gpp-Sbi-Sender-Timestamp = "3gpp-Sbi-Sender-Timestamp" ":" OWS day-name "," SP date1 SP time-of-day "." milliseconds SP
GMT
milliseconds = 3DIGIT
day-name, date1, time-of-day shall comply with the definition in clause 7.1.1.1 of IETF RFC 7231.
```

When a 3gpp-Sbi-Sender-Timestamp header is generated, the sender should generate its field value as the best available approximation of the date and time of message generation. This is the same format as the Date header of clause 7.1.1.2 of IETF RFC 7231, but with the time expressed with millisecond granularity. An example of a 3gpp-Sbi-Sender-Timestamp header is as follows:

EXAMPLE: 3gpp-Sbi-Sender-Timestamp: Sun, 4 Aug. 2019
08:49:37.845 GMT

The 3gpp-Sbi-Max-Rsp-Time header is defined in clause 5.2.3.3.3 of 3GPP TS 29.500. The 3gpp-Sbi-Max-Rsp-Time header indicates the duration, expressed in milliseconds since the request was originated, during which the HTTP client waits for a response. See clause 6.11.2. The encoding of the header follows the ABNF as defined in IETF RFC 7230. The encoding and an example are as follows:

```
3gpp-Sbi-Max-Rsp-Time = "3gpp-Sbi-Max-Rsp-Time" ":" OWS 1*5DIGIT
EXAMPLE: 3gpp-Sbi-Max-Rsp-Time: 10000.
```

Clause 4.3 of 3GPP TS 29.500 describes detection and handling of late arriving requests. It is suggested to use the 3gpp-Sbi-Sender-Timestamp and 3gpp-Sbi-Max-Rsp-Time at the NF service producer for rejecting messages that arrive late. However, the specifications do not describe or suggest how to appropriately set or configure 3gpp-Sbi-Max-Rsp-Time header values.

An HTTP client originating a request may include in the request the 3gpp-Sbi-Sender-Timestamp and the 3gpp-Sbi-Max-Rsp-Time headers indicating respectively the absolute time at which the request is originated and the maximum time period to complete the processing of the request. The headers together indicate the absolute time at which the request times out at the HTTP client.

According to an aspect of the subject matter described herein, an NF service consumer, including an SCP acting as an NF service consumer, may provide SBI message feeds and configuration data to a network analytics data director (NADD). The NADD may determine or calculate, from the SBI message feeds, service operation processing times of NF service producers and provide analytics data, including the service operation processing times and configuration details, to NF service consumers. The NF service consumers may use the analytics data to automatically configure 3gpp-Sbi-Max-Rsp-Time headers.

Figure 2:
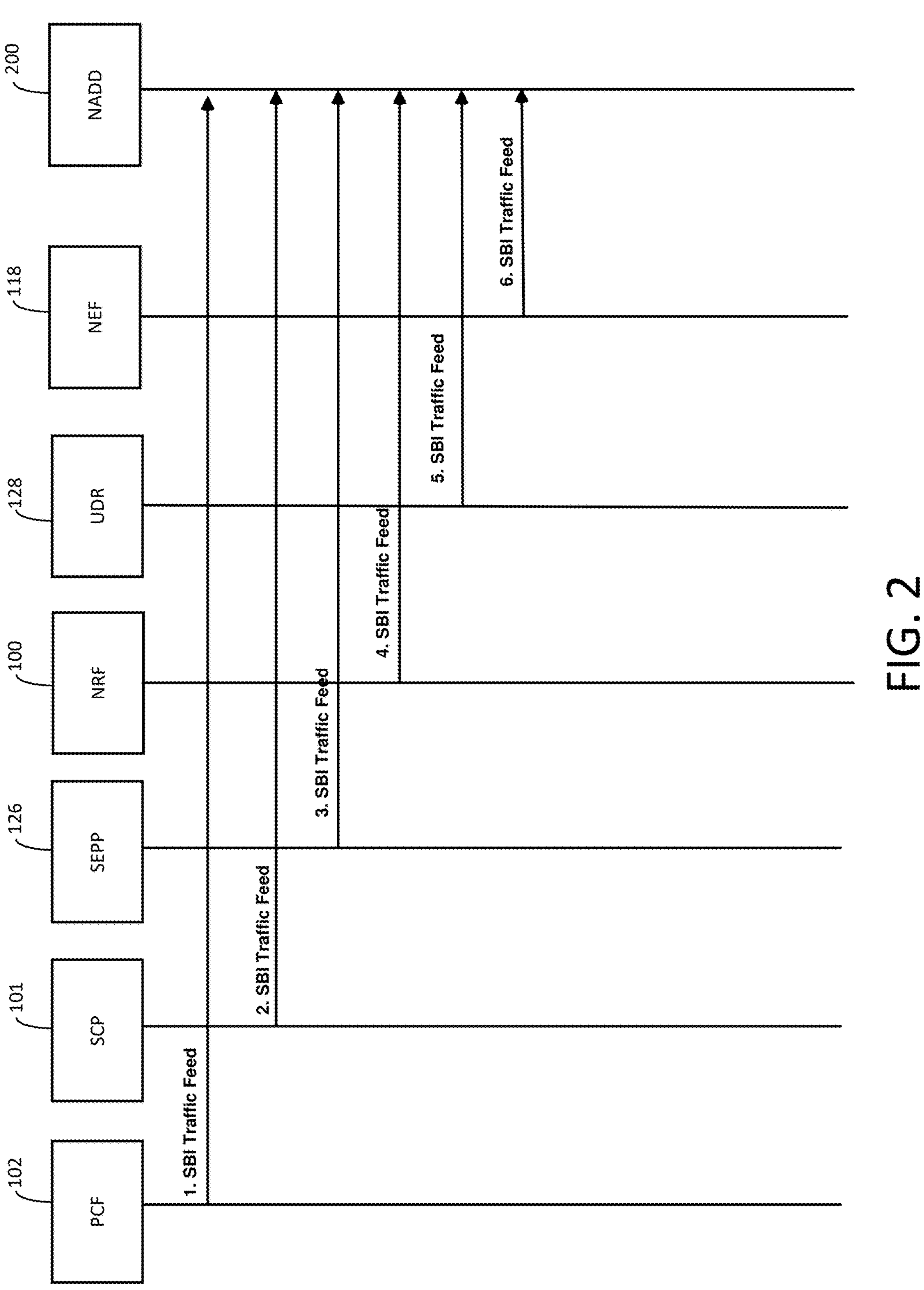
FIG. 2 is a message flow diagram illustrating NFs, an SCP, and a SEPP, providing SBI message feeds to an NADD.

FIG. 2 is a message flow diagram illustrating NFs, an SCP, and a SEPP providing SBI message feeds to an NADD. In FIG. 2, PCF 102, SCP 101, SEPP 126, NRF 100, UDR 128, and NEF 118 each provide an SBI message feed to NADD 200. The SBI message feed may include copies of SBI request and response messages transmitted and received by each NF, SCP, or SEPP. In addition to or as part of the SBI message feeds, each of PCF 102, SCP 101, SEPP 126, NRF 100, UDR 128, and NEF 118 may provide configuration details, such as NF type, services provided, maximum numbers of SBI transaction reattempts allowed, etc., to NADD 200. NADD 200 may receive the information and use the information to generate and send analytics data feeds to NF service consumers. Examples of information that may be included in the analytics data feeds will be described below. The NF service consumers may utilize the analytics data to automatically configure 3gpp-Sbi-Max-Rsp-Time header values for SBI request messages.

The 3gpp-Sbi-Max-Rsp-Time header value depends on the path traversed between an NF service consumer and an NF service producer, operator configuration of re-attempts at an SCP, the current status of the NF service producer, and other attributes. Operators currently statically configure the 3gpp-Sbi-Max-Rsp-Time header value on the SCP and then adjust the value manually at each NF service consumer based on the value configured at the SCP and other parameters. The 3gpp-Sbi-Max-Rsp-Time header value is supposed to cascade to lower values as the message progresses towards the destination, which results in a need for a "right to left" (or downstream to upstream) configuration. The appropriate 3gpp-Sbi-Max-Rsp-Time header value is challenging to configure. Rather than configuring the appropriate 3gpp-Sbi-Max-Rsp-Time header values, a network operator may configure a higher than needed value at the NF service consumer, which is inefficient due to the need for keeping track of pending transactions for longer durations of time, which results in wasting of CPU resources for monitoring and memory resources for storage of transaction state information. A value of the 3gpp-Sbi-Max-Rsp-Time header that is unnecessarily low will cause an SBI request to be rejected and is also inefficient.

One problematic case of configuration of the 3gpp-Sbi-Max-Rsp-Time header value can occur when the NF service consumer fails to account for an NF topology update. The 3gpp-Sbi-Max-Rsp-Time header value needs to be manually updated on the NF service consumer in response to any changes in the NF topology. Because the update process is manual, the process is subject to error.

Figure 3:
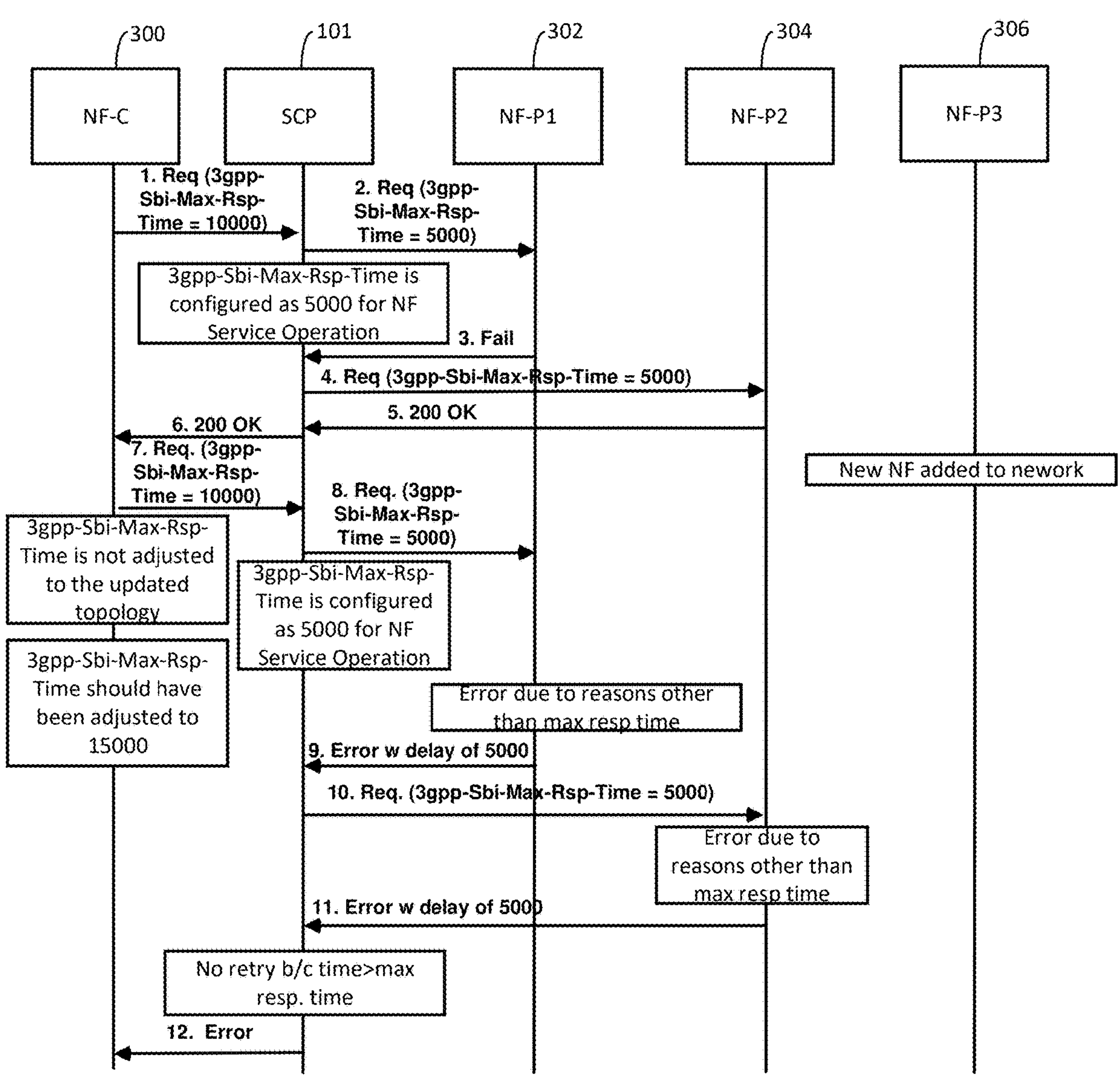
FIG. 3 is a message flow diagram illustrating a problem that can occur with manual configuration of the 3gpp-Sbi-Max-Rsp-Time header value at an NF service consumer that fails to account for an NF topology update.

FIG. 3 is a message flow diagram illustrating a problem that can occur with manual configuration of the 3gpp-Sbi-Max-Rsp-Time header value at an NF service consumer that fails to account for an NF topology update. Referring to FIG. 3, in step 1, an NF service consumer 300 sends an SBI request to SCP 101. NF service consumer 300 sets the 3gpp-Sbi-Max-Rsp-Time header value in the message to 10000 milliseconds (ms) based on static configuration of the value on NF service consumer 300. SCP 101 receives the SBI request message, and, in step 2, sends the SBI request message to NF service producer 302. SCP 101 sets the 3gpp-Sbi-Max-Rsp-Time header value to 5000 ms based on static configuration of the value at the SCP. In step 3, NF service producer 302 notifies SCP 101 that processing of the SBI request failed. In step 4, SCP 101 sends the SBI request to NF service producer 304 with a 3gpp-Sbi-Max-Rsp-Time header value of 5000 ms. In step 5, NF service producer 304 successfully processes the SBI request message and returns an SBI response message to SCP 101. In step 6, SCP 101 forwards the SBI response message to NF service consumer 300.

After step 6, a new NF service producer 306 is added to the network, and the 3gpp-Sbi-Max-Rsp-Time header value at NF service consumer 300 is not updated. In step 7, NF service consumer 300 sends an SBI request to SCP 101. NF service consumer 300 sets the 3gpp-Sbi-Max-Rsp-Time header value in the message to 10000 ms, even though the 3gpp-Sbi-Max-Rsp-Time header value should be set to 15000 ms to account for the addition of the new NF service producer. SCP 101 receives the SBI request message, and, in step 8, sends the SBI request message to NF service producer 302. SCP 101 sets the 3gpp-Sbi-Max-Rsp-Time header value to 5000 ms. An error occurs in processing the SBI request message for a reason other than the 3gpp-Sbi-Max-Rsp-Time header value. In step 9, NF service producer 302 notifies SCP 101 that processing of the SBI request failed. In step 10, SCP 101 sends the SBI request message to NF service producer 304 with a 3gpp-Sbi-Max-Rsp-Time header value of 5000 ms. An error occurs in processing the SBI request message for a reason other than the 3gpp-Sbi-Max-Rsp-Time header value. In step 11, NF service producer 304 sends an error response to SCP 101. SCP 101 does not re-try the request, even though NF service producer 306 is available to process the request, because the 3gpp-Sbi-Max-Rsp-Time header value of 10000 ms specified by NF service consumer 300 has been exceeded. In step 12, SCP 101 sends an error response message to NF service consumer 300.

Figure 4A:
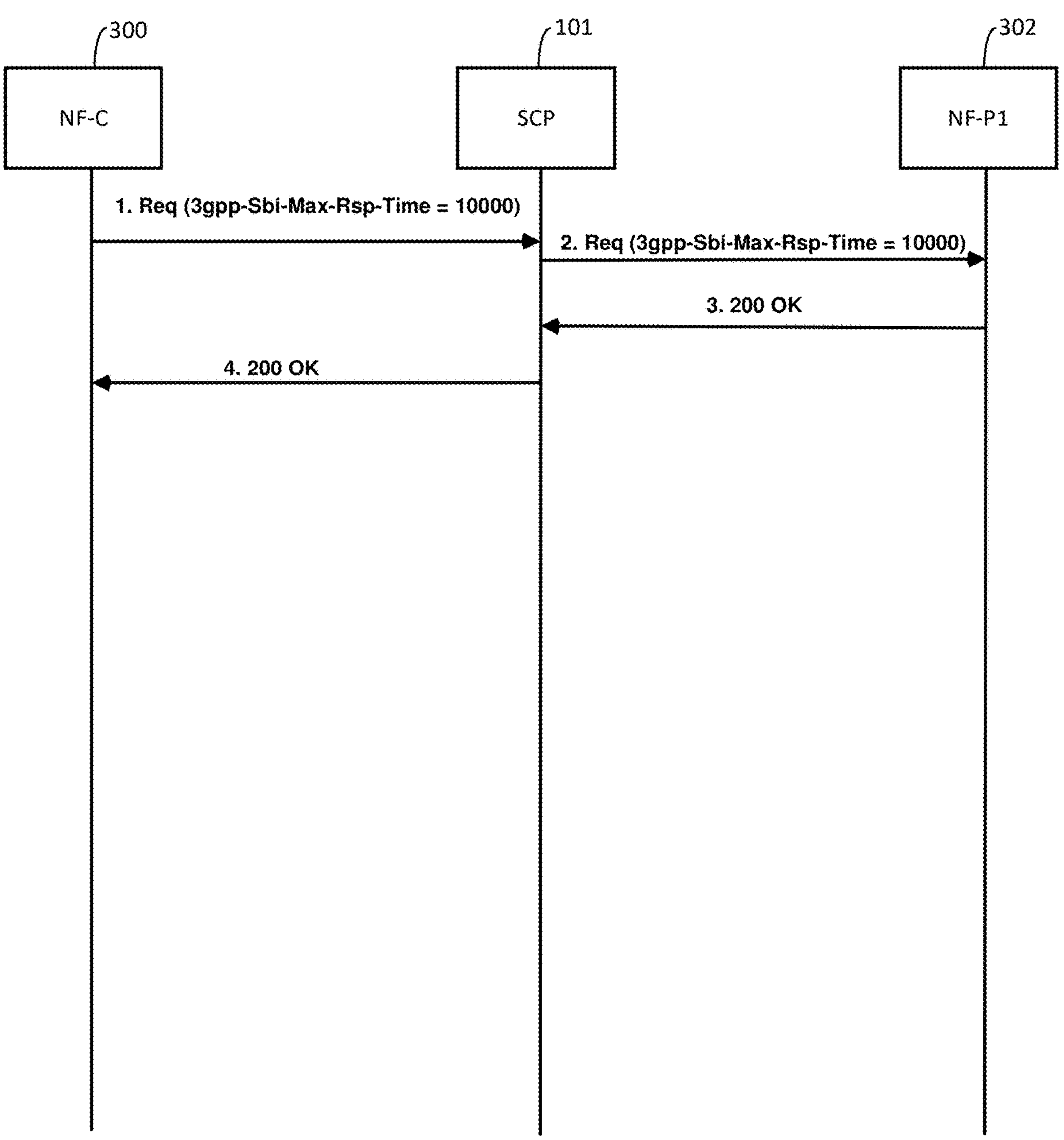
FIG. 4A illustrates an SCP statically configured to use 10000 ms as the 3gpp-Sbi-Max-Rsp-Time header value at the SCP to route an SBI request to a single NF service producer.

In some deployments, network operators choose to keep the 3gpp-Sbi-Max-Rsp-Time header value constant at the NF service consumer and adjust the 3gpp-Sbi-Max-Rsp-Time header value at the SCP based on topology updates. Again, the process is manual and error-prone. FIG. 4A illustrates an SCP statically configured to use 10000 ms as the 3gpp-Sbi-Max-Rsp-Time header value to route an SBI request to a single NF service producer. Referring to FIG. 4A, in step 1, NF service consumer 300 sends an SBI request with a 3gpp-Sbi-Max-Rsp-Time header value of 10000 ms to SCP 101. In step 2, SCP 101 forwards the SBI request to NF service producer 302 with the same 3gpp-Sbi-Max-Rsp-Time header value of 10000 ms. NF service producer 302 receives the SBI request, successfully processes the request within the time period defined by the 3gpp-Sbi-Max-Rsp-Time header value (and the sender timestamp header value), and, in step 3, responds with a 200 OK message. In step 4, SCP 101 forwards the 200 OK message to NF service consumer 300.

In another example, it is assumed that more NF service producer(s) are added to the topology illustrated in FIG. 4A, and the 3gpp-Sbi-Max-Rsp-Time header value on SCP 101 is adjusted to 5000 ms for each NF service producer. Static configuration of the 3gpp-Sbi-Max-Rsp-Time header value on the SCP has limitations. For example, the granularity of static configuration is limited to the SBI service operation type, but it may be challenging to set different 3gpp-Sbi-Max-Rsp-Time header values for each individual NF service producer due to the large number of NF service producers and the dynamic nature of the 5GC network where NF service producers may be added or deleted as needed. Due to this static configuration, messages sent to NF service producers supporting the same SBI service operation type will always have the same value of 3gpp-Sbi-Max-Rsp-Time.

Figure 4B:
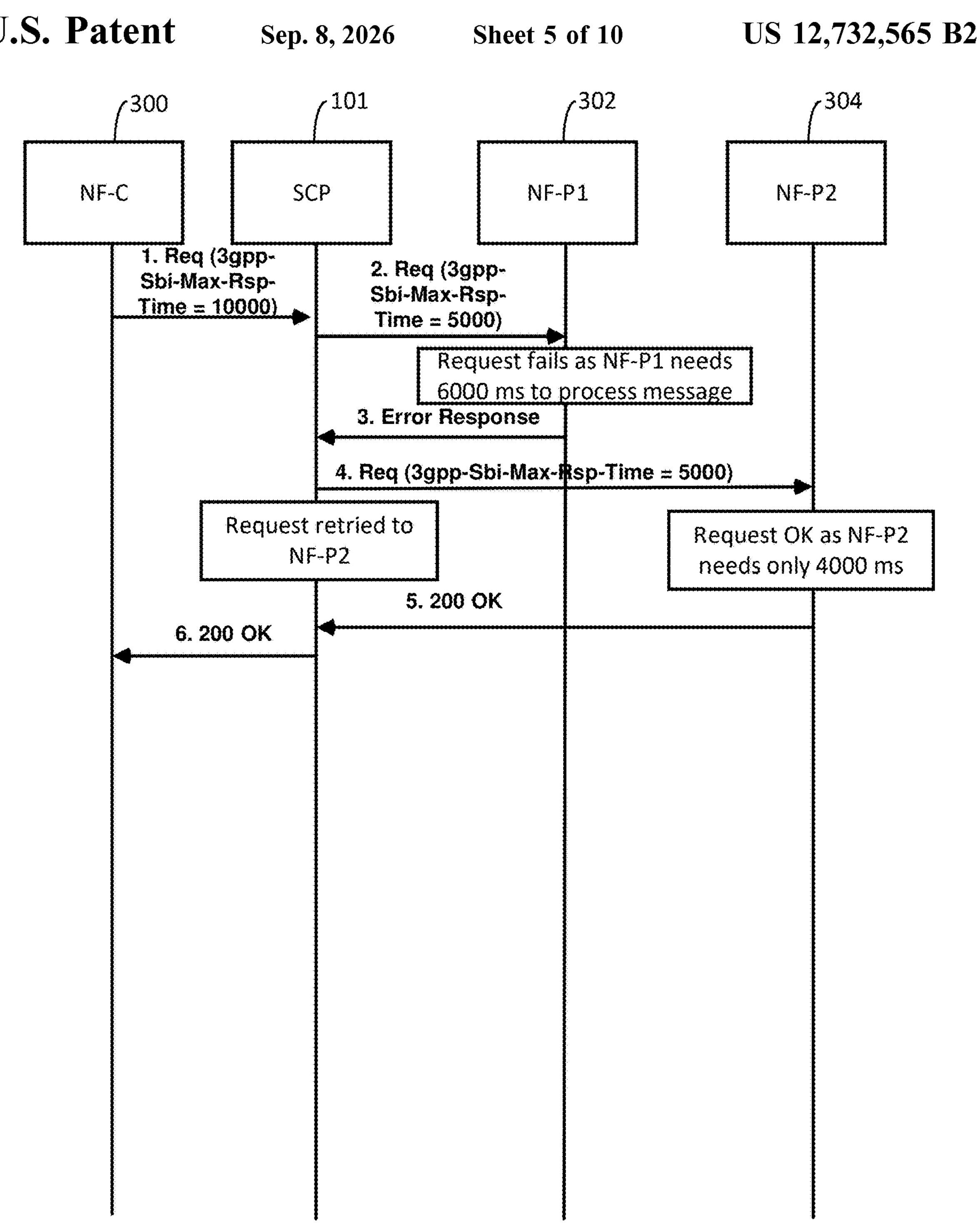
FIG. 4B is a message flow diagram illustrating a case where two NF service producers are available to process an SBI request and the SCP uses a statically configured 3gpp-Sbi-Max-Rsp-Time header value for SBI requests directed to the NF service producers.

FIG. 4B is a message flow diagram illustrating a case where two NF service producers are available to process an SBI request and the SCP uses a statically configured 3gpp-Sbi-Max-Rsp-Time header value for SBI requests directed to the NF service producers. Referring to FIG. 4B, in step 1, NF service consumer 300 sends an SBI request with a 3gpp-Sbi-Max-Rsp-Time header value of 10000 ms to SCP 101. In step 2, SCP 101 forwards the SBI request to NF service producer 302 with a 3gpp-Sbi-Max-Rsp-Time header value of 5000 ms. NF service producer 302 receives the SBI request and fails to process the request within the time specified by the 3gpp-Sbi-Max-Rsp-Time header value of 5000 ms received from SCP 101 because NF service producer 302 needs 6000 ms to process the message. Accordingly, in step 3, NF service producer 302 sends an error response to SCP 101. In step 4, SCP 101 retries by sending the SBI request to NF service producer 304. NF service producer 304 processes the request because NF service producer 304 only needs 4000 ms to process the request. In step 5, NF service producer 304 sends a 200 OK message to SCP 101. In step 6, SCP 101 forwards the 200 OK message to NF service consumer 300. While the SBI request was eventually successfully processed in FIG. 4B, ideally, a re-attempt should not have been tried, and NF service producer 302 should have been given more time to process the request.

Figure 4C:
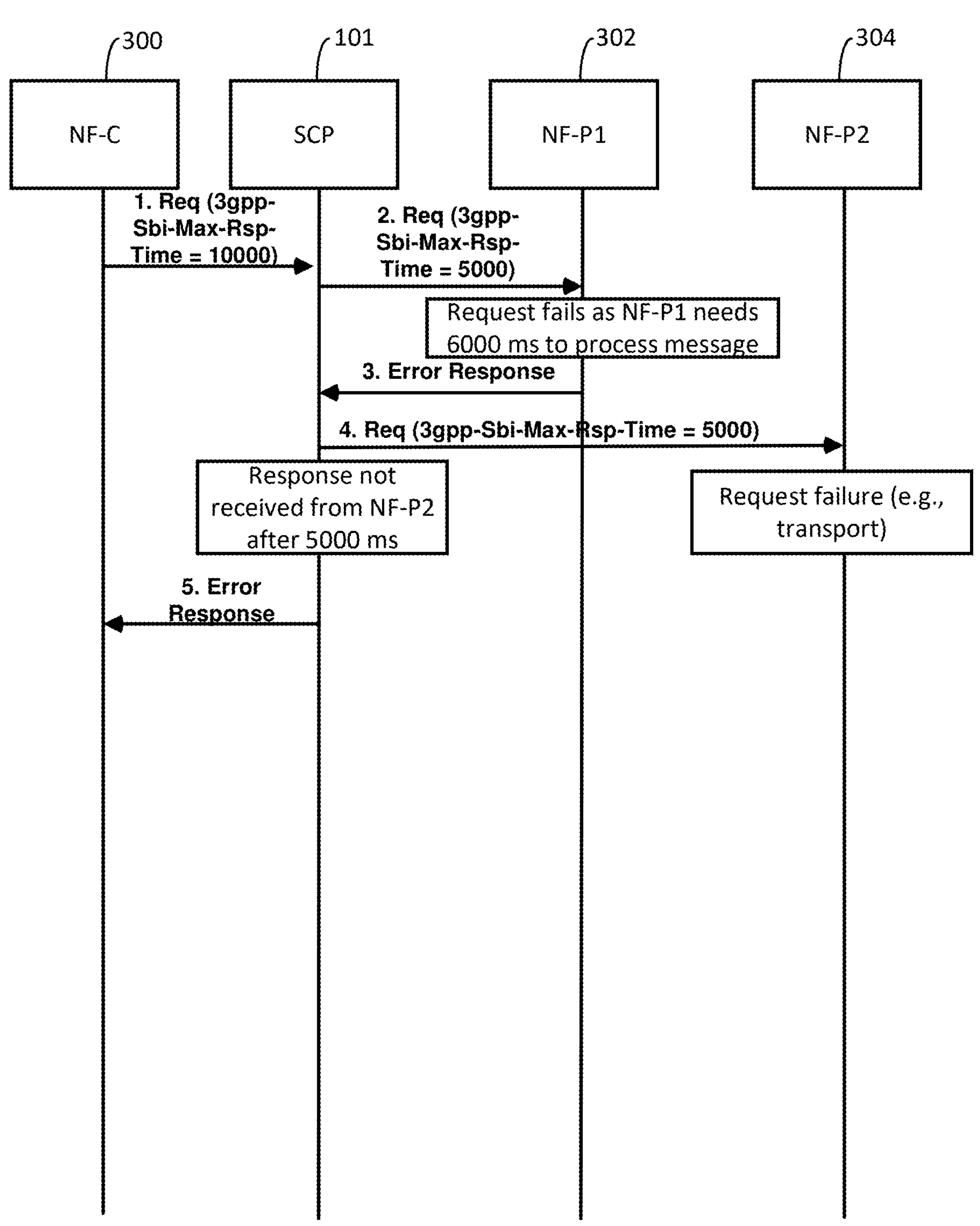
FIG. 4C is a message flow diagram illustrating a case where an NF service producer is not given sufficient time to process an SBI request message, and the transaction fails because of the lack of an alternate NF service producer to process the SBI request message.

FIG. 4C is a message flow diagram illustrating a case where an NF service producer is not given sufficient time to process an SBI request message, and the transaction fails because of the lack of an alternate NF service producer to process the SBI request message. Referring to FIG. 4C, in step 1, NF service consumer 300 sends an SBI request with a 3gpp-Sbi-Max-Rsp-Time header value of 10000 ms to SCP 101. In step 2, SCP 101 forwards the SBI request to NF service producer 302 with a 3gpp-Sbi-Max-Rsp-Time header value of 10000 ms. NF service producer 302 receives the SBI request and fails to process the request within the time specified by the 3gpp-Sbi-Max-Rsp-Time header value of 5000 ms received from SCP 101. Accordingly, in step 3, NF service producer 302 sends and error response to SCP 101. In step 4, SCP 101 retries by sending the SBI request to NF service producer 304. NF service producer 304 is not available, and processing of the SBI request fails.

Another problematic case for statically configured 3gpp-Sbi-Max-Rsp-Time header values is the inability to set different values for 3GPP communication model C and 3GPP communication model D. In a 3GPP communication model C deployment, the NF service consumer chooses the NF service producer, and the SCP performs SBI request message routing. In a 3GPP communication model D deployment, the SCP performs NF discovery and SBI message routing. The 3gpp-Sbi-Max-Rsp-Time header value should be adjusted by the NF service consumer to handle the differences between 3GPP communication model C and 3GPP communication model D. However, using a single statically configured 3gpp-Sbi-Max-Rsp-Time header values at the NF service consumer and at the SCP will fail to achieve such adjustment.

To avoid the aforementioned difficulties, an NF service consumer, including an SCP operating as an NF service consumer may use analytics data received from the NADD to automatically configure the 3gpp-Sbi-Max-Rsp-Time header value for a selected NF service producer and route. The NADD determines, from the SBI message feeds, information about processing, network delays, and network topology. Further, NFs may send to the NADD, in addition to SBI message feeds, their respective configuration data (e.g. maximum number of re-attempts configured on the SCP) and KPIs (key performance indicators) to facilitate 3gpp-Sbi-Max-Rsp-Time analysis and automatic determination for the selected NF service producer and the route. In one example, the NADD may provide the following analytics data to the NF service consumer:

- Per-NF-service-operation processing times (e.g., minimum, maximum, average/median) for each NF service producer instance with respect to each traffic reporting source.
- Configuration details, such as maximum re-attempt/retries configured for various entities involved in the route for each service operation type.
- KPIs for different entities involved in the route for each service operation type.
- Predicted times for different NF service operations and routes.
- Validity time for the analytics data.

Figure 5:
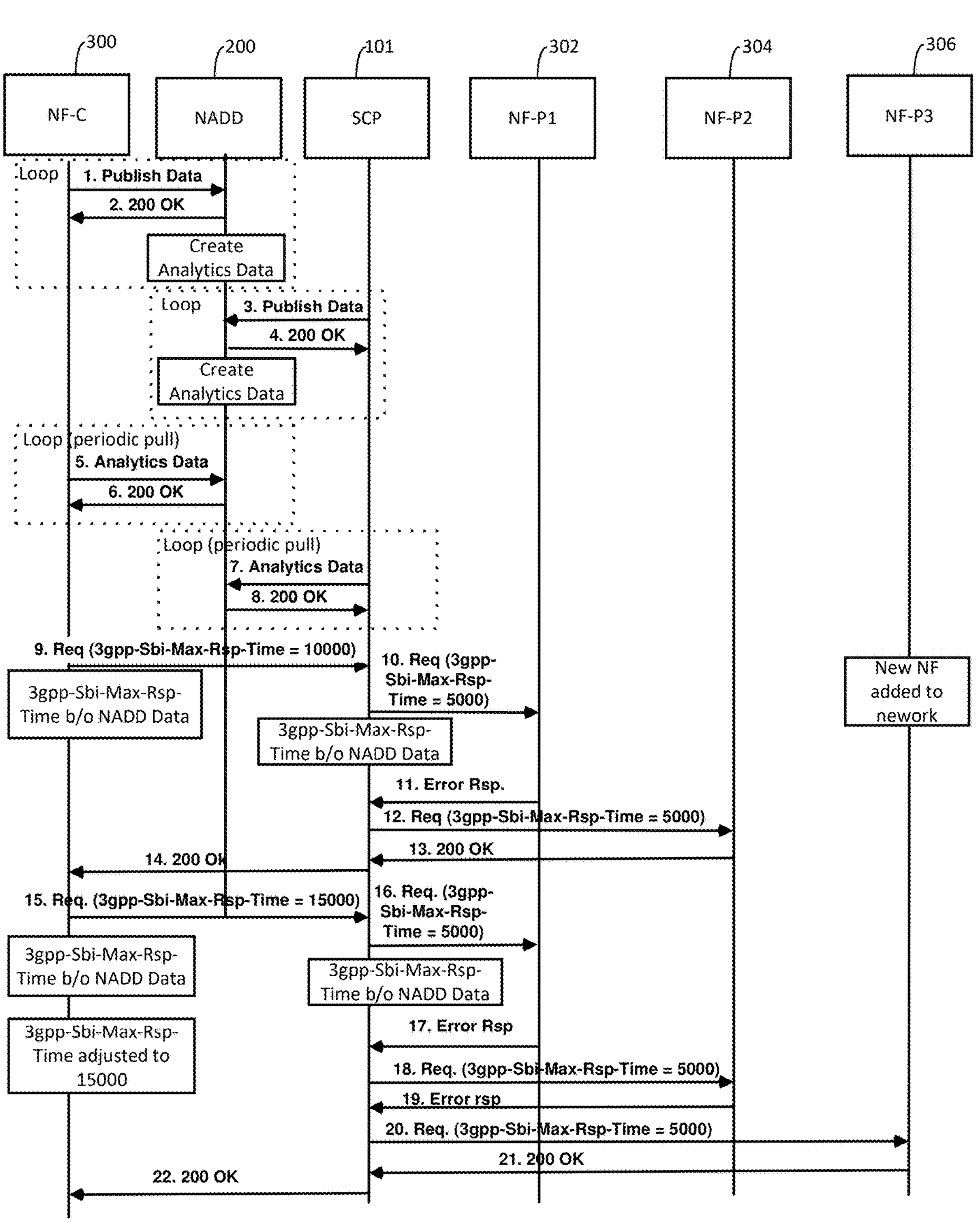
FIG. 5 is a message flow diagram illustrating the use of NADD-generated analytics data by an NF service consumer to automatically configure the 3gpp-Sbi-Max-Rsp-Time header value and address the problem illustrated in FIG. 3.

In one example, the subject matter described herein provides a solution to the static configuration of the 3gpp-Sbi-Max-Rsp-Time header value at the NF service consumer described above with respect to FIG. 3. FIG. 5 is a message flow diagram illustrating the use of NADD-generated analytics data by an NF service consumer to automatically configure the 3gpp-Sbi-Max-Rsp-Time header value and address the problem illustrated in FIG. 3. Referring to FIG. 5, in step 1, NF service consumer 300 publishes its SBI message feed and configuration data to NADD 200. In step 2, NADD 200 responds with a 200 OK message and creates analytics data from the information received from NF service consumer 300. Steps 1 and 2 may be repeated continually in a loop.

In step 3, SCP 101 publishes its SBI message feed and configuration data to NADD 200. In step 4, NADD 200 responds with a 200 OK message and creates analytics data from the information received from SCP 101. Steps 3 and 4 may be repeated continually in a loop.

In step 5, NF service consumer 300 requests analytics data from NADD 200. In step 6, NADD 200 responds by providing the analytics data to NF service consumer 300. The analytics data may include any of the above-described analytics data examples, such as processing delays for different service operation types and routes. Steps 5 and 6 may be repeated continually at operator-configured time intervals.

In step 7, SCP 101 requests analytics data from NADD 200. In step 8, NADD 200 responds by providing the analytics data to SCP 101. The analytics data may include any of the above-described analytics data examples, such as processing delays for different service operation types and routes. Steps 7 and 8 may be repeated continually at operator-configured time intervals.

In step 9, NF service consumer 300 sends an SBI request to SCP 101 with a 3gpp-Sbi-Max-Rsp-Time header value of 10000 ms automatically set by NF service consumer 300 based on the analytics data received from NADD 200. For example, the analytics data may indicate that there are two NF service producers available to process the SBI request, each with predicted processing delays of 5000 ms. Accordingly, NF service consumer 300 may set the 3gpp-Sbi-Max-Rsp-Time header value to be greater than or equal to the sum of the predicted processing delays of the NF service producers capable of processing the SBI request. In this example, the processing delays are each 5000 ms, and there are two NF service producers. Accordingly, NF service consumer 300 sets the 3gpp-Max-Rsp-Time header value to 5000+5000=10000 ms.

SCP 101 receives the SBI request and, in step 10, forwards the request to NF service producer 302. SCP 101 configures the 3gpp-Sbi-Max-Rsp-Time header value in the SBI request based on the analytics data received from NADD 200 to be 5000 ms. In this example, 5000 ms is chosen, because 5000 ms is the predicted processing time of each NF service producer 302 and 304. NF service producer 302 receives the SBI request, and processing of the SBI request fails for a reason other than the 3gpp-Sbi-Max-Rsp-Time header value. In step 11, NF service producer 302 sends an error response to SCP 101.

In step 12, SCP 101 retries sending the SBI request to NF service producer 304. In the retry message, SCP 101 sets, based on the analytics data received from NADD 200, the 3gpp-Sbi-Max-Rsp-Time header value to 5000 ms. NF service producer 304 receives the SBI request, successfully processes the request, and, in step 13, sends a success response to SCP 101. In step 14, SCP 101 forwards the success response to NF service consumer 300.

After step 14, it is assumed that a new NF service producer 306 is brought into service. The new NF service producer may send its configuration and SBI message feeds to NADD 200. NADD 200 determines the analytics data described above and provides the analytics data to each of the NFs. In this example, it is assumed that NADD 200 informs NF service consumer 300 that NF service producer 306 has been added to the network and has a predicted SBI request processing time of 5000 ms. Accordingly, in step 15, NF service consumer 300 generates and sends an SBI request to SCP 101. NF service consumer 300 sets, based on the analytics data received from NADD 200, the 3gpp-Sbi-Max-Rsp-Time header value to be 15000 ms. In this example, 15000 ms is used because 15000 represents the sum of the predicted processing delays of NF service producers 302, 304, and 306. SCP 101 receives the SBI request, and, in step 16, forwards the SBI request to NF service producer 302 with a 3gpp-Sbi-Max-Rsp-Time header value set, based on analytics data received from NADD 200, to 5000 ms. NF service producer 302 receives the SBI request, processing of the SBI request fails, and, in step 17, NF service producer 302 sends an error response to SCP 101.

SCP 101 receives the error response from NF service producer 302, and, in step 18, retries sending the SBI request to NF service producer 304 with a 3gpp-Sbi-Max-Rsp-Time header value set, based on analytics data received from NADD 200, to 5000 ms. NF service producer 304 receives the SBI request, processing of the SBI request fails, and, in step 19, NF service producer 304 sends an error response to SCP 101.

SCP 101 receives the error response from NF service producer 304, and, in step 20, retries sending the SBI request to NF service producer 306 with a 3gpp-Sbi-Max-Rsp-Time header value set, based on analytics data received from NADD 200, to 5000 ms. NF service producer 306 receives the SBI request, successfully processes the request, and, in step 21, sends a success response to SCP 101. In step 22, SCP 101 forwards the success response to NF service consumer 300. Thus, in FIG. 5, successful routing of an SBI request to a newly instantiated NF service producer is achieved using 3gpp-Sbi-Max-Rsp-Time header values automatically determined by an NF service consumer using analytics data received from NADD 200.

Figure 6:
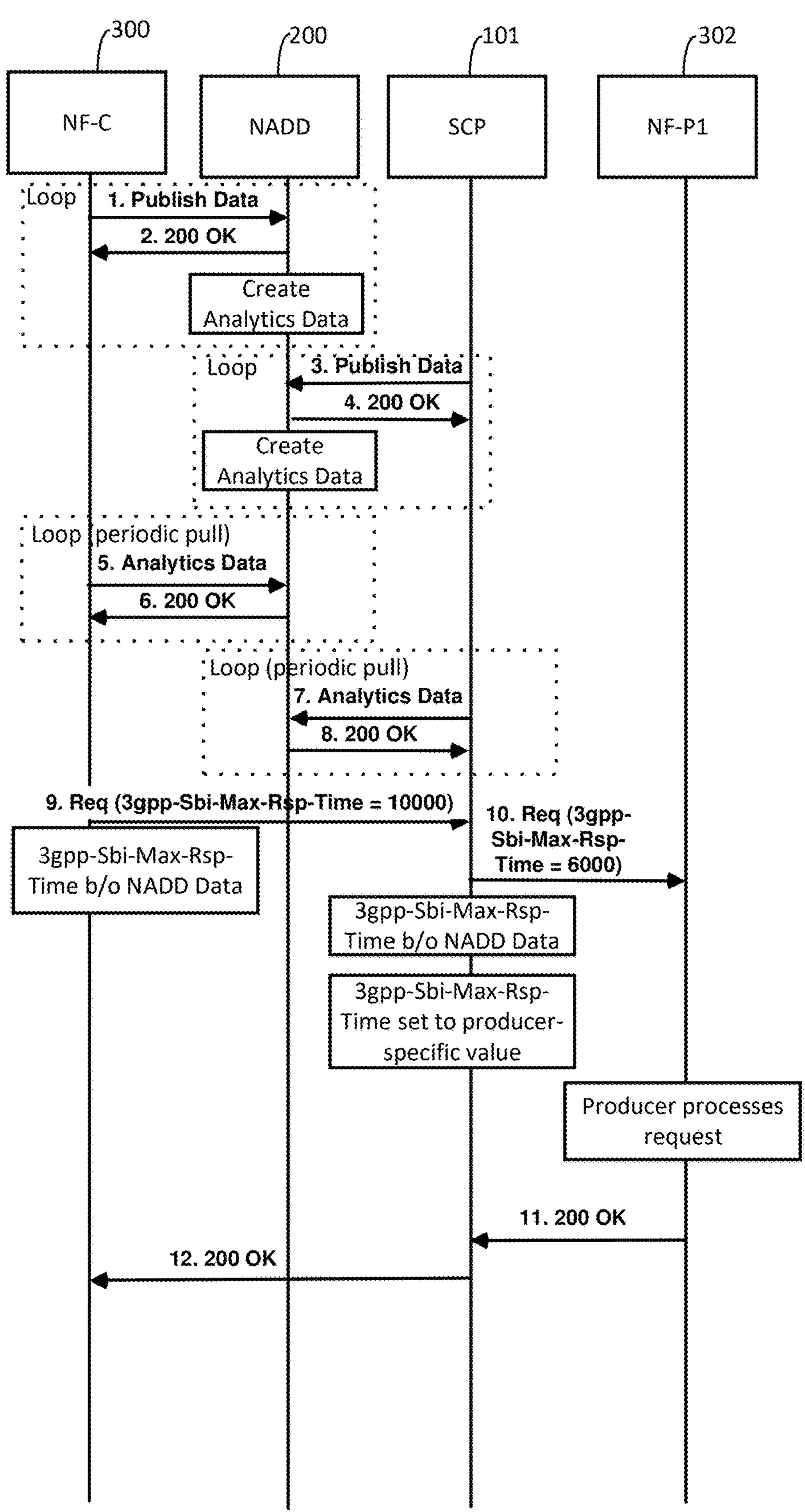
FIG. 6 is a message flow diagram illustrating the use of NADD-generated analytics data by an SCP to automatically configure the 3gpp-Sbi-Max-Rsp-Time header value and address the problem illustrated in FIGS. 4B and 4C.

FIG. 6 is a message flow diagram illustrating the use of NADD-generated analytics data by an SCP to automatically configure the 3gpp-Sbi-Max-Rsp-Time header value and address the problem illustrated in FIGS. 4B and 4C. Referring to FIG. 6, in step 1, NF service consumer 300 publishes its SBI message feed and configuration data to NADD 200. In step 2, NADD 200 responds with a 200 OK message and creates analytics data from the information received from NF service consumer 300. Steps 1 and 2 may be repeated continually in a loop.

In step 3, SCP 101 publishes its SBI message feed and configuration data to NADD 200. In step 4, NADD 200 responds with a 200 OK message and creates analytics data from the information received from SCP 101. Steps 3 and 4 may be repeated continually in a loop.

In step 5, NF service consumer 300 requests analytics data from NADD 200. In step 6, NADD 200 responds by providing the analytics data to NF service consumer 300. The analytics data may include any of the above-described analytics data examples, such as processing delays for different service operation types and routes. Steps 5 and 6 may be repeated continually at operator-configured time intervals.

In step 7, SCP 101 requests analytics data from NADD 200. In step 8, NADD 200 responds by providing the analytics data to SCP 101. The analytics data may include any of the above-described analytics data examples, such as processing delays for different service operation types and routes. Steps 7 and 8 may be repeated continually at operator-configured time intervals.

In step 9, NF service consumer 300 sends to SCP 101 an SBI request with a 3gpp-Sbi-Max-Rsp-Time header value set, based on analytics data received from NADD 200, to 10000 ms. In step 10, SCP 101 forwards the SBI request to NF service producer 302 with a 3gpp-Sbi-Max-Rsp-Time header value set, based on analytics data received from NADD 200, to an NF-service-producer-specific value of 6000 ms. In this example, NF service producer 302 receives the SBI request and successfully processes the request. Accordingly, in step 11, NF service producer 302 sends a success response to SCP 101. In step 12, SCP 101 forwards the success response to NF service consumer 300. Thus, in FIG. 6, SCP 101 automatically configures the 3gpp-Sbi-Max-Rsp-Time header value to an NF-service-producer-specific value using analytics data generated by NADD 200.

In another example, an NF service consumer may use NADD-generated analytics data to automatically configure the 3gpp-Sbi-Max-Rsp-Time header value based on the route of an SBI request message and/or to account for time differences in delivering the message to a destination using 3GPP communication model C and 3GPP communication model D. In general, the 3gpp-Sbi-Max-Rsp-Time header value may be sent to a sufficiently large value to account for transit delays along a route, making the value route-specific. For an SBI request message being sent by an NF service consumer according to 3GPP communication model D, the NF service consumer may configure the 3gpp-Sbi-Max-Rsp-Time header value to be larger than the value for a message sent by the NF service consumer according to 3GPP communication model C to account for the additional time required to perform delegated discovery in 3gpp communication model C. Conversely, the NF service consumer may configure set the 3gpp-Max-Rsp-Time header value to a smaller value for an SBI request being sent by the NF service consumer according to 3GPP communication model C than the value for a message being sent by the NF service consumer according to 3GPP communication model D to reflect the time required to deliver the message to its destination using 3GPP communication model C without delegated discovery.

Figure 7:
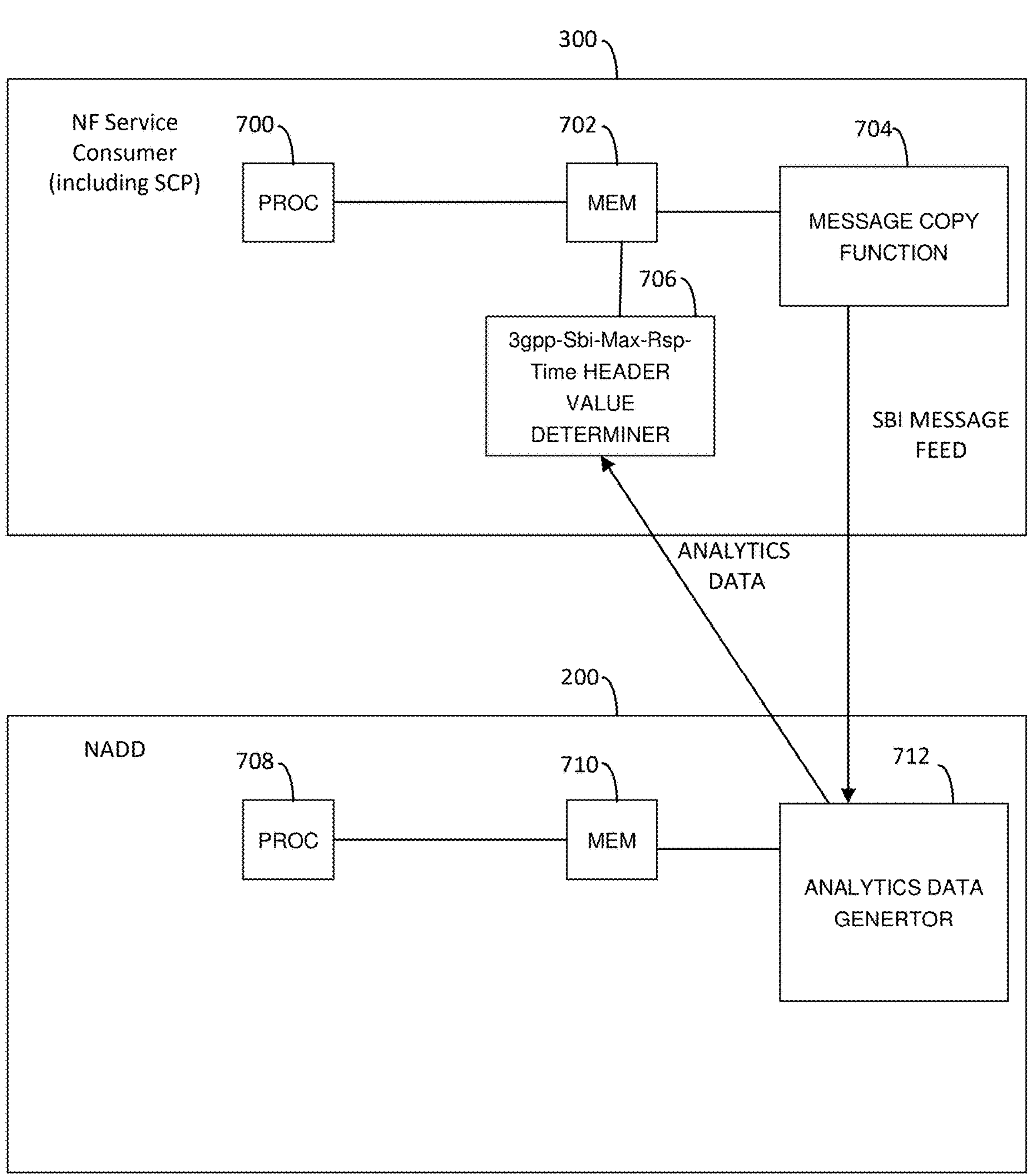
FIG. 7 is a block diagram illustrating exemplary architectures for an NF service consumer and an NADD for generating and utilizing NF analytics data to automatically configure a 3gpp-Sbi-Max-Rsp-Time header value.

FIG. 7 is a block diagram illustrating exemplary architectures for an NF service consumer and an NADD for generating and utilizing NF analytics data to automatically configure a 3gpp-Sbi-Max-Rsp-Time header value. Referring to FIG. 7, NF service consumer 300 includes at least one processor 700 and memory 702. NF service consumer 300 further includes a message copy function 704 that copies SBI messages transmitted by or received by NF service consumer 300 and provides an SBI message (copy) feed to NADD 200. NF service consumer 300 further includes a 3gpp-Sbi-Max-Rsp-Time header value determiner 706 that receives an analytics data feed from NADD 200 and automatically determines, based on the analytics data, 3gpp-Sbi-Max-Rsp-Time header values to include in SBI request messages transmitted by NF service consumer 300. Message copy function 704 and 3gpp-Sbi-Max-Rsp-Time header value determiner 706 may be implemented using computer-executable instructions stored in memory 702 and executed by processor 700.

NADD 200 includes at least one processor 708 and a memory 710. NADD 200 further includes an analytics data generator 712 that receives the SBI message feed from NF service consumer 300 and from other NFs, generates, from the feeds, analytics data, and communicates the analytics data to NFs, such as NF service consumer 300. Examples of analytics data and the generation of such data are described above. Analytics data generator 712 may be implemented using computer executable instructions stored in memory 710 and executed by processor 708.

Figure 8:
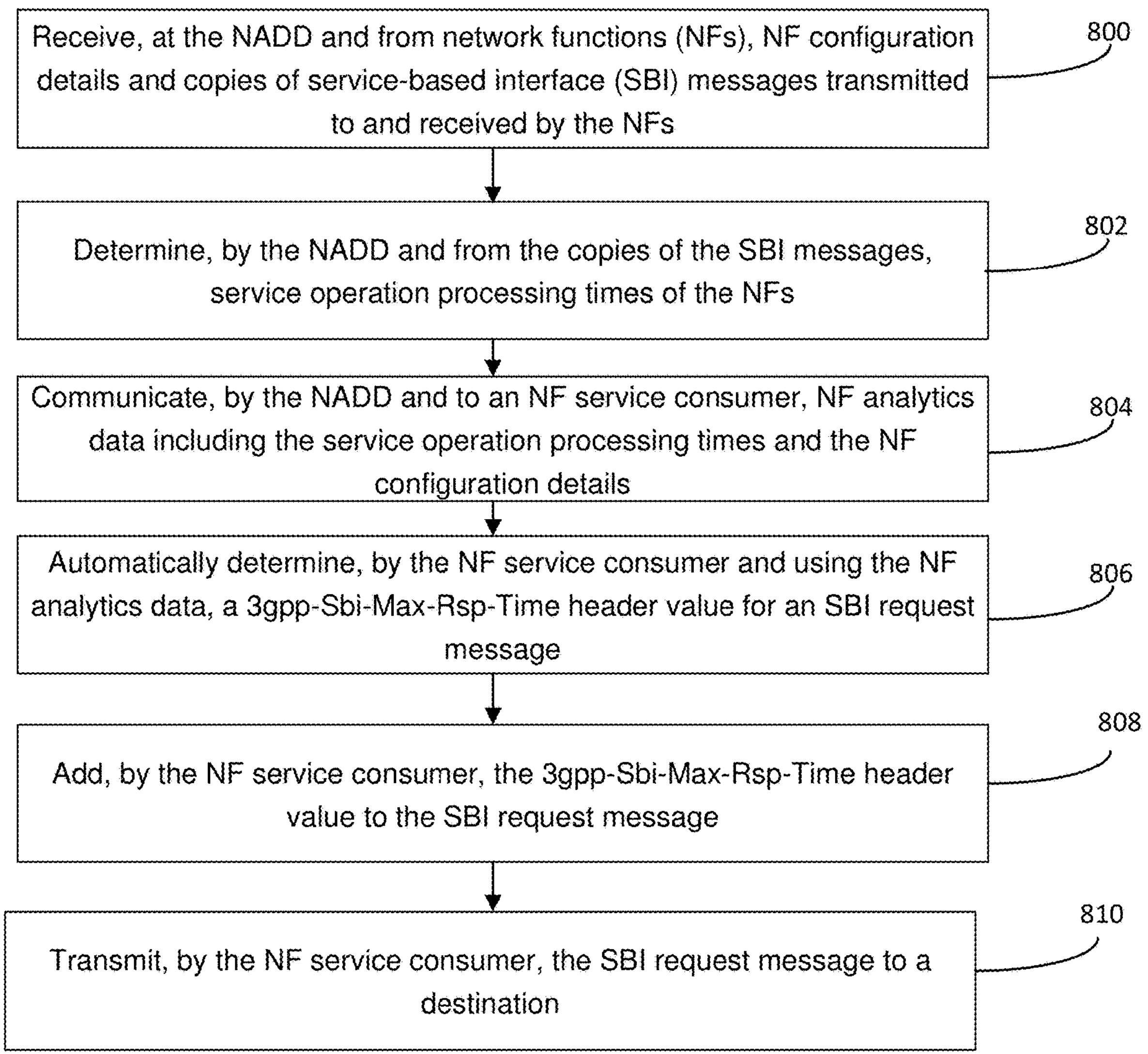
FIG. 8 is a flow chart illustrating an exemplary process for network analytics data director (NADD)-informed configuration of a 3gpp-Sbi-Max-Rsp-Time header value

FIG. 8 is a flow chart illustrating an exemplary process for network analytics data director (NADD)-informed configuration of a 3gpp-Sbi-Max-Rsp-Time header value. Referring to FIG. 8, in step 800, the process includes receiving, at the NADD and from network functions (NFs), NF configuration details and copies of service-based interface (SBI) messages transmitted to and received by the NFs. For example, a network analytics function, such as NADD 200, may receive, from NFs (consumer NFs, producer NFs) and other network entities, such as SCPs and SEPPs, SBI message feeds including copies of SBI messages transmitted and received by the NFs and network entities. NADD 200 may also receive, as part of the feeds from each NF and network entity, configuration details of the NF or network entity, such as NF type, NF service operations offered, maximum number of SBI message retries allowed, etc.

In step 802, the process further includes determining, by the NADD and from the copies of the SBI messages, service operation processing times of the NFs. For example, a network analytics function, such as NADD 200, may calculate, from timestamps associated with SBI request and response messages, times required to perform/provide service operations. For example, if the NF is an NRF, NADD 200 may determine a time associated with an NF discovery service operation by calculating the time difference between a time of receipt by the NRF of an NF discovery request and the time of transmission, by the NRF, of an NF discovery response. NADD 200 may determine statistical measures and predicted values of the NF service operation processing times. For example, NADD 200 may determine minimum, maximum, and average or median NF service operation processing times. NADD 200 may determine a predicted NF service operation processing time using the statistical measures and other parameters, such as NF loading and time of day.

In step 804, the process further includes communicating, by the NADD and to an NF service consumer, NF analytics data including the service operation processing times and the NF configuration details. For example, a network analytics function, such as NADD 200, may transmit the NF analytics data and the NF configuration details to an NF service consumer periodically and/or in response to a polling request from the NF service consumer.

In step 806, the process further includes automatically determining, by the NF service consumer and using the NF analytics data, a 3gpp-Sbi-Max-Rsp-Time header value for an SBI request message. For example, an NF service consumer, such as NF service consumer 300 or an SCP functioning as an NF service consumer, may set the 3gpp-Sbi-Max-Rsp-Time header value to be sufficiently large value to allow retransmissions to all of the NF service producers capable of processing an SBI request message. In another example, NF service consumer 300 may set the 3gpp-Sbi-Max-Rsp-Time header value to be equal to an NF-service-producer-specific (e.g., predicted, average, median) SBI request processing time. In yet another example, NF service consumer 300 may set the 3gpp-Sbi-Max-Rsp-Time header value to a value specific to the predicted amount of time required to process the SBI request according to the 3GPP communication model (e.g., communication model C or communication model D).

In step 808, the process further includes adding, by the NF service consumer, the 3gpp-Sbi-Max-Rsp-Time header value to the SBI request message. For example, an NF service consumer, such as NF service consumer 300 or an SCP functioning as an NF service consumer, may add the 3gpp-Sbi-Max-Rsp-Time header value calculated in step 806 to the SBI request message.

In step 810, the process further includes transmitting, by the NF service consumer, the SBI request message to a destination. For example, an NF service consumer, such as NF service consumer 300 or an SCP functioning as an NF service consumer, may transmit the SBI request message to a target producer network function or to an intermediate node, such as an SCP or a SEPP, for delivery to the target producer network function.

Exemplary advantages of the subject matter described herein include providing for appropriate configuration of the 3gpp-Sbi-Max-Rsp-Time header value, reducing network operational costs due to automatic configuration of the 3gpp-Sbi-Max-Rsp-Time header value, and reducing the likelihood of human error in the configuration of the 3gpp-Sbi-Max-Rsp-Time header value. Further advantages of the subject matter described herein include improving network resiliency by reducing the likelihood of an NF service consumer sending multiple requests due to a misconfigured 3gpp-Sbi-Max-Rsp-Time header value and reducing message latency through fewer message retries. Another advantage of the subject matter described herein includes improved processor and memory utilization on NF service consumers due to appropriate configuration of 3gpp-Sbi-Max-Rsp-Time header value. The total cost of ownership of NFs, SCPs, and SEPPs may also be improved by the improved resource utilization resulting from the automatic 3gpp-Max-Rsp-Time header value configuration described herein.

The subject matter described herein may be implemented on any NF or other network entity, including SCPs, SEPPs, or NFs, including but not limited to PCFs, NEFs, NRFs, BSFs, UDRs, and NSSFs). The analytics data generation and communication functionality described herein can be implemented on a network analytics node, such as NADD 200.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 19) 3GPP TS 29.510 V19.0.0 (2024-09)
2. 3rd Generation Partnership Project; Technical Specification Group Core Network and Terminals; 5G System; Technical Realization of Service Based Architecture; Stage 3 (Release 18) 3GPP TS 29.500 V18.7.0 (2024-09)
3. Fielding et al., "Hypertext Transfer Protocol (HTTP/1.1): Message Syntax and Routing," IETF RFC 7230 (June 2014)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network analytics data director (NADD)-informed configuration of a 3gpp-Sbi-Max-Rsp-Time header value, the method comprising:

receiving, at the NADD and from network functions (NFs), NF configuration details and copies of service-based interface (SBI) messages transmitted to and received by the NFs;

determining, by the NADD and from the copies of the SBI messages, service operation processing times of the NFs;

communicating, by the NADD and to an NF service consumer, NF analytics data including the service operation processing times and the NF configuration details;

automatically determining, by the NF service consumer and using the NF analytics data, a 3gpp-Sbi-Max-Rsp-Time header value for an SBI request message;

adding, by the NF service consumer, the 3gpp-Sbi-Max-Rsp-Time header value to the SBI request message; and transmitting, by the NF service consumer, the SBI request message to a destination.

2. The method of claim 1, wherein receiving the copies of the SBI messages includes receiving SBI message feeds from the NFs.

3. The method of claim 1, wherein determining the service operation processing times includes determining minimum, maximum, and mean or median service operation processing times of the NFs.

4. The method of claim 1, wherein communicating the NF configuration details includes communicating data indicating maximum re-attempts allowed by a service communication proxy (SCP).

5. The method of claim 1, wherein communicating the NF analytics data comprises communicating predicted times for different service operations and routes.

6. The method of claim 1, wherein automatically determining, by the NF service consumer, a 3gpp-Sbi-Max-Rsp-Time header value includes setting the value to account for retries to NF service producers added to a network topology.

7. The method of claim 1, wherein automatically determining, by the NF service consumer, a 3gpp-Sbi-Max-Rsp-Time header value includes setting the value to account for an NF-service-producer-specific processing delay.

8. The method of claim 1, wherein automatically determining, by the NF service consumer, a 3gpp-Sbi-Max-Rsp-Time header value includes setting the value to account for a Third Generation Partnership Project communication model used to send the SBI request message.

9. The method of claim 1, wherein automatically determining, by the NF service consumer, a 3gpp-Sbi-Max-Rsp-Time header value includes setting the value to account for delays associated with a route of the SBI request message.

10. The method of claim 1, wherein the NF service consumer comprises a service communication proxy (SCP).

11. A system for network analytics data director (NADD)-informed configuration of a 3gpp-Sbi-Max-Rsp-Time header value, the system comprising:

a network analytics data director including at least one processor and a memory for receiving, from network functions (NFs), NF configuration details and copies of service-based interface (SBI) messages transmitted to and received by the NFs, determining, by the NADD and from the copies of the SBI messages, service operation processing times of the NFs, and communicating NF analytics data including the service operation processing times and the NF configuration details; and an NF service consumer including at least one processor and a memory for receiving the analytics data from the NADD, automatically determining, using the NF analytics data, a 3gpp-Sbi-Max-Rsp-Time header value for an SBI request message, adding the 3gpp-Sbi-Max-Rsp-Time header value to the SBI request message, and transmitting the SBI request message to a destination.

12. The system of claim 11, wherein the NADD is configured to determine minimum, maximum, and mean or median service operation processing times of the NFs.

13. The system of claim 11, wherein the NADD is configured to communicate, to the NF service consumer, data indicating a maximum number of re-attempts allowed by a service communication proxy (SCP).

14. The system of claim 11, wherein the NADD is configured to communicate, to the NF service consumer, predicted times for different service operations and routes.

15. The system of claim 11, wherein the NF service consumer is configured to automatically determine the 3gpp-Sbi-Max-Rsp-Time header value by setting the value to account for retries to NF service producers added to a network topology.

16. The system of claim 11, wherein the NF service consumer is configured to automatically determine the 3gpp-Sbi-Max-Rsp-Time header value by setting the value to account for an NF-service-producer-specific processing delay.

17. The system of claim 11, wherein the NF service consumer is configured to automatically determine the 3gpp-Sbi-Max-Rsp-Time header value by setting the value to account for a Third Generation Partnership Project communication model used to send the SBI request message.

18. The system of claim 11, wherein the NF service consumer is configured to automatically determine the 3gpp-Sbi-Max-Rsp-Time header value by setting the value to account for delays associated with a route of the SBI request message.

19. The system of claim 11, wherein the NF service consumer comprises a service communication proxy (SCP).

20. One or more non-transitory computer readable media having stored thereon computer-executable instructions that when executed by one or more processors of one or more computers cause the one or more computers to perform steps comprising:

receiving, at a network analytics data director (NADD) and from network functions (NFs), NF configuration details and copies of service-based interface (SBI) messages transmitted to and received by the NFs;

determining, by the NADD and from the copies of the SBI messages, service operation processing times of the NFs;

communicating, by the NADD and to an NF service consumer, NF analytics data including the service operation processing times and the NF configuration details;

automatically determining, by the NF service consumer and using the NF analytics data, a 3gpp-Sbi-Max-Rsp-Time header value for an SBI request message;

adding, by the NF service consumer, the 3gpp-Sbi-Max-Rsp-Time header value to the SBI request message; and transmitting, by the NF service consumer, the SBI request message to a destination.

* * * * *